E. H. GOLD.
HOSE COUPLING.
APPLICATION FILED APR. 13, 1917.
1,282,068.
Patented Oct. 22, 1918.
3 SHEETS—SHEET 1.
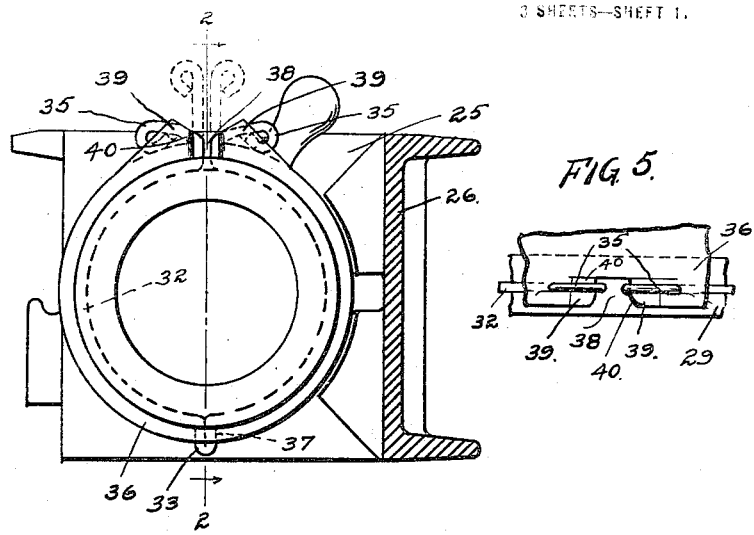
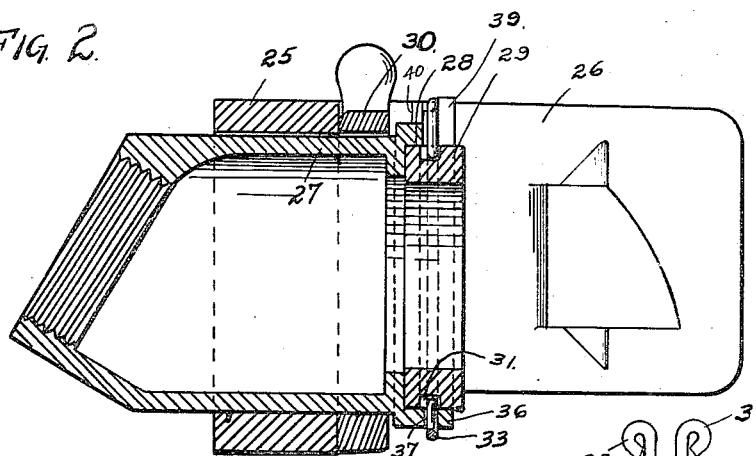
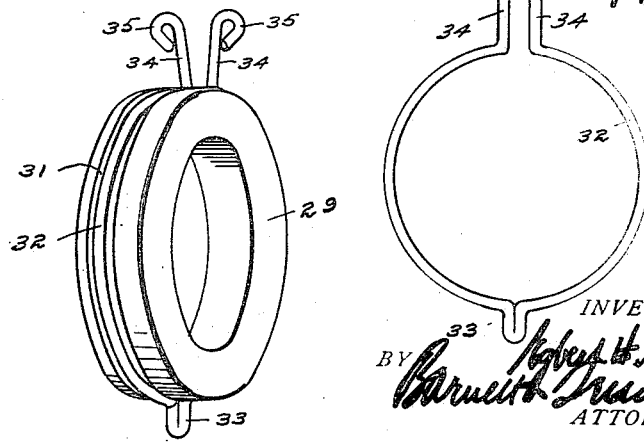
INVENTOR.
Robert H. Gold
BY Barnett Freeman
ATTORNEYS

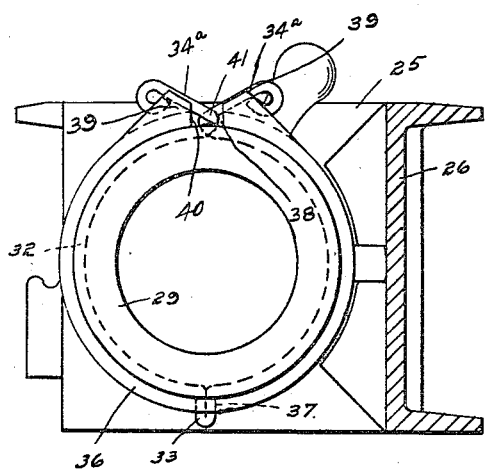
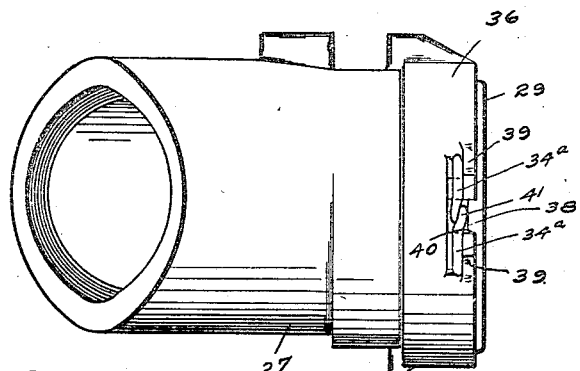
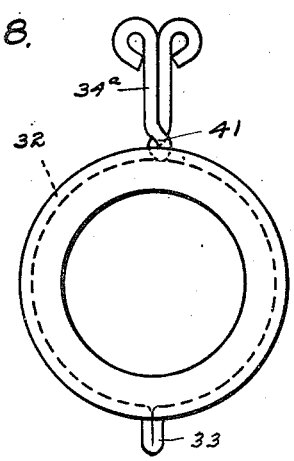
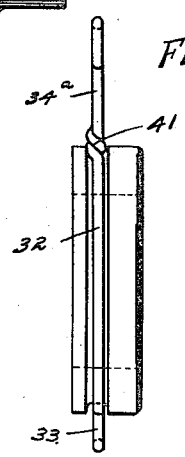

E. H. GOLD.
HOSE COUPLING.
APPLICATION FILED APR. 19, 1917.
1,282,068.
Patented Oct. 22, 1918.
3 SHEETS—SHEET 3.
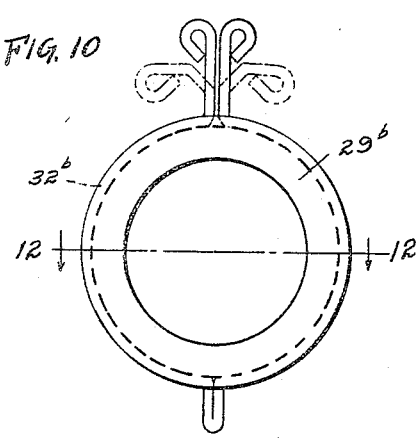
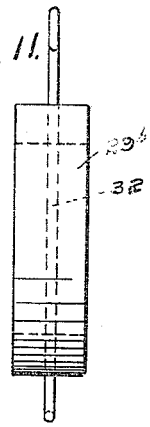
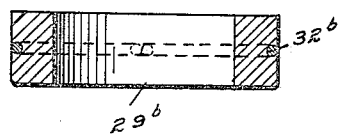
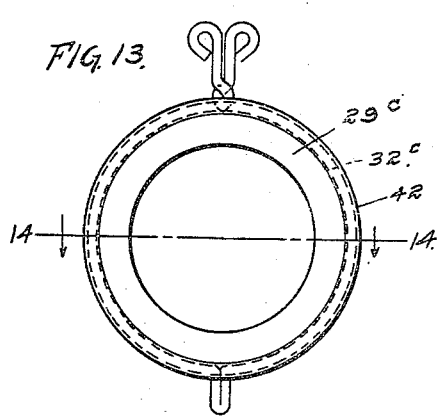
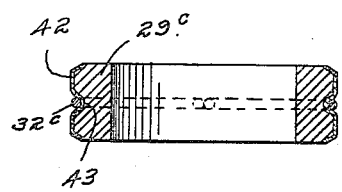
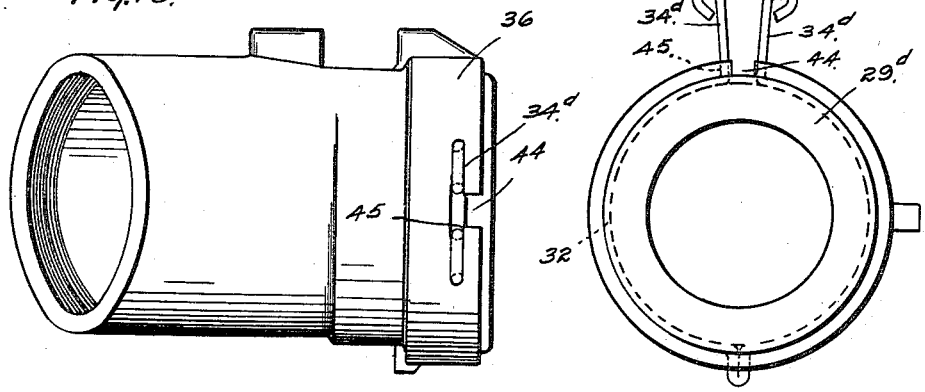

UNITED STATES PATENT OFFICE.

EGBERT H. GOLD, OF CHICAGO, ILLINOIS.

HOSE-COUPLING.

1,282,068.  Specification of Letters Patent.  Patented Oct. 22, 1918.

Application filed April 19, 1917. Serial No. 163,234.

*To all whom it may concern:*

Be it known that I, EGBERT H. GOLD, a citizen of the United States, residing at Chicago, in the county of Cook and State of Illinois, have invented certain new and useful Improvements in Hose-Couplings, of which the following is a specification.

My invention relates to hose couplers, more particularly to couplers suitable for use in coupling up the steam train pipes of railway cars; and the invention has for its object to provide a simple inexpensive device for holding a hose coupler gasket in place in its seat in the coupler, which device may be readily manipulated for the purpose of putting the gasket in place or removing it from the coupler, and is arranged on the outside of the gasket so that it forms no obstruction to the steam port as is the case with most of the gasket holders now in use.

The invention consists in the new and improved devices and arrangements to be hereinafter described and claimed for carrying out the above stated objects and such other incidental objects as will appear from the following description.

The invention is illustrated, in certain preferred embodiments, in the accompanying drawings wherein—

Figure 1 is a view, in elevation, of the face of a coupler, with the locking arm in section, showing the gasket held in place by a gasket holder constructed in accordance with my invention.

Fig. 2 is a longitudinal sectional view on line 2—2 of Fig. 1.

Fig. 3 is a view, in perspective, of the gasket and gasket holding device.

Fig. 4 is a view of the gasket holding device alone.

Fig. 5 is a fragmentary plan view illustrating the manner in which the gasket is fastened in place in its seat.

Fig. 6 is a view similar to Fig. 1 showing a modified form of gasket holder.

Fig. 7 is a plan view of a part of the coupler shown in the preceding figure.

Fig. 8 is a detail face view of the gasket and modified form of gasket holder.

Fig. 9 is a side view of the gasket and gasket holder.

Fig. 10 is a face view of the gasket and holder showing another form of the invention.

Fig. 11 is a side view of the gasket and holder showing another form of the invention.

Fig. 12 is a sectional view on line 12—12 of Fig. 10.

Figs. 13 and 14 are views illustrating a further modification, Fig. 13 showing the gasket and holder in elevation and Fig. 14 being a section on line 14—14 of Fig. 13.

Figs. 15 and 16 show still different embodiments of the invention, Fig. 15 being a plan view of the gasket holding part of the coupler and Fig. 16 a face view of the gasket and gasket holding device.

Like characters of reference designate like parts in the several figures of the drawings.

I have shown the gasket holding means of my invention as employed in a hose coupler of the general type shown in the application of Edward A. Russell and Seelye P. Harriman, Serial No. 73,885, filed January 24, 1916. This particular type of hose coupler is chosen arbitrarily, for the purpose of illustrating a practical application of the device of my invention which might be utilized in any steam train pipe coupling now in use by railroads, and quite possibly also in other similar situations.

Referring first to Figs. 1 to 5 inclusive, 25 designates the coupler head and 26 its locking arm which is adapted to engage the head of a mating coupler. 27 is a conduit member which is formed at one end with a seat 28 for the gasket 29. 30 is the cam ring for moving the conduit member 27 in the head 25. The gasket is formed with a circumferential groove 31 in which is seated a wire 32, the middle portion of which is bent so as to form a stud or projection 33, the rest of the wire being bent into almost a complete circle with the extremities 34 projecting outwardly away from the gasket and preferably looped over, as indicated at 35. The flange 36 which forms a part of the seat for the gasket has a perforation 37 to receive the stud 33 on the fastening ring 32. The flange 36 is formed at a point diametrically opposite perforation 37 with a slot 38, on opposite sides of which are lugs 39, 39 and back of these similar lugs 40, 40. The fingers 30 are spread after they have been introduced into slot 38 and bent down over lugs 40 so that they stand behind lugs 39. When the gasket is to be removed from the coupler it is a simple matter to bend the fingers back to their original position.

In Figs. 6 to 9 inclusive, the arrangement is the same except that the fingers 34ª of the ring 32ª are twisted together, as indicated at 41, so that the ring is more reliably engaged with the gasket. In some cases it may be desirable to ship and handle the gaskets and rings permanently united in this manner.

In Figs. 10, 11 and 12, the ring 32ᵇ is shown as molded into gasket 29ᵇ.

In Figs. 13 and 14 the gasket 29ᶜ is provided with a metal ferrule 42 formed with a groove 43 to receive the fastening ring 32ᶜ.

The arrangement illustrated in Figs. 15 and 16 is somewhat different. The flange 36ᵈ in which the gasket 29ᵈ is seated is formed with a T slot 44. The fingers 34ᵈ of ring 32ᵈ stand a trifle apart at their upper ends but may be sprung together so as to pass through the mouth of the slot. When released they expand in the cross slots 45 so as to hold the gasket in place.

I claim:

1. The combination with a coupler having a gasket seat, of a gasket provided with an exterior projection and a bendable fastening element arranged entirely outside the port of said gasket, which projection and element are adapted to engage said gasket seat to hold the gasket in place therein.

2. The combination with a coupler having a gasket seat, of a gasket provided with an exterior projection and an oppositely arranged, bendable fastening element; said seat being formed with an opening to receive said projection, and a slot to receive the bendable fastening element.

3. The combination with a coupler having a gasket seat, of a gasket provided with an exterior projection and an oppositely arranged, bendable fastening element; said seat being formed with an opening to receive said projection, a slot to receive the bendable fastening element, and a lug adapted to stand in front of said bendable element when in operative position.

4. The combination with a coupler having a gasket seat, of a gasket provided with an exterior projection and diametrically opposite therefrom a pair of bendable fastening elements; said seat being formed with an opening to receive said projection, and a slot to receive said bendable fastening elements which are adapted to be spread to hold the gasket in place.

5. The combination with a coupler having a gasket seat, of a gasket provided with an exterior projection and diametrically opposite therefrom a pair of bendable fastening elements; said seat being formed with an opening to receive said projection, a slot to receive said bendable fastening elements which are adapted to be spread to hold the gasket in place, and lugs on opposite sides of said slot adapted to stand in front of the bendable fastening elements when in operative position.

6. The combination with a coupler having a gasket seat, of a gasket and a wire bent to circular form extending around and engaged with said gasket provided with a projection and an oppositely arranged bendable finger, said gasket seat being formed with an opening to receive said projection, and a slot to receive said finger.

7. The combination with a coupler having a gasket seat, of a gasket and a wire bent to circular form extending around and engaged with said gasket, provided with a projection and diametrically opposite therefrom a pair of bendable fingers; said seat being formed with an opening to receive said projection, and a slot to receive said fingers which are adapted to be spread to hold the gasket in place.

8. The combination with a coupler having a gasket seat, of a gasket and a wire bent to circular form extending around and engaged with said gasket, the middle portion of which is offset to form a stud, the ends of which project outwardly from the gasket providing bendable fingers; said seat being formed with an opening to receive said stud and with a slot to receive said fingers.

9. The combination with a coupler having a gasket seat, of a gasket and a wire bent to circular form extending around and engaged with said gasket, the middle portion of which is offset to form a stud, the ends of which project outwardly from the gasket providing bendable fingers; said seat being formed with an opening to receive said stud and with a slot to receive said fingers, and lugs on opposite sides of said slot adapted to stand in front of said fingers when the latter are bent down toward the coupler.

10. The combination with a coupler having a gasket seat, of a gasket formed with a circular groove and a wire bent to circular form seated in said groove, the middle portion of which is offset to form a stud, the ends of which project outwardly from the gasket providing bendable fingers; said seat being formed with an opening to receive said stud and with a slot to receive said fingers, and lugs on opposite sides of said slot adapted to stand in front of said fingers when the latter are bent down toward the coupler.

11. The combination with a coupler having a gasket seat, of a gasket and a wire bent to circular form extending around and engaged with said gasket, provided with a projection and diametrically opposed therefrom a pair of bendable fingers twisted together adjacent the gasket; said seat being formed with an opening to receive said projection, a slot to receive said bendable fingers which are adapted to be spread to hold the gasket in place, and lugs on opposite sides of said slot adapted to stand in front of said bendable fingers when in operative position.

12. The combination with a coupler having a gasket holding flange formed with openings therein, of a gasket, and a bendable wire on the outer perimeter of the gasket having outward projections adapted to extend into said openings and engage said gasket with said flange.

13. The combination with a coupler having a gasket holding flange formed with openings therein, of a gasket, and gasket retaining means arranged entirely out of the port of said gasket comprising a stud member and a bendable member, which members are adapted to enter said openings and engage the gasket with said flange.

14. The combination with a coupler having a gasket seat, of a gasket provided with an exterior projection and a bendable fastening element, said seat being formed with an opening to receive said projection and a slot to receive the bendable fastening element.

EGBERT H. GOLD.